United States Patent [19]

Penn et al.

[11] 4,399,949
[45] Aug. 23, 1983

[54] WINDING FORM FOR DYNAMOELECTRIC MACHINE

[75] Inventors: William B. Penn; Kenneth R. Reynolds, both of Erie, Pa.

[73] Assignee: General Electric Company, Research Triangle Park, N.C.

[21] Appl. No.: 219,553

[22] Filed: Dec. 23, 1980

[51] Int. Cl.³ .................. H02K 15/14; H02K 15/09
[52] U.S. Cl. .......................................... 242/1; 29/423; 29/598; 140/71.5; 242/7.03; 242/7.05 R; 310/43; 310/270
[58] Field of Search ............... 242/1, 7.05 B, 7.05 C, 242/7.05 A, 7.05 R, 7.03; 29/598, 423, 605, 498; 140/71.5; 310/270, 260, 43

[56] References Cited

U.S. PATENT DOCUMENTS

| | | |
|---|---|---|
| 829,801 | 8/1906 | Pratt et al. ............................ 29/498 |
| 3,273,226 | 9/1966 | Brous et al. ........................... 29/423 |
| 3,294,125 | 12/1966 | Heine .................................. 140/71.5 |
| 4,063,123 | 12/1977 | Herr et al. ............................ 310/270 |

*Primary Examiner*—Billy S. Taylor
*Attorney, Agent, or Firm*—Irving M. Freedman; Vale P. Myles

[57] ABSTRACT

A winding form made of readily removable material for use in positioning electric windings in predetermined spaced relationship on an electrical apparatus. A method for mounting a winding on an electrical apparatus using the winding form of the invention is also disclosed wherein the form is mounted in a preselected position on the apparatus, windings are wound around the form, then the form is removed from between the apparatus and the windings by either dissolving it in a suitable solvent or by melting it effectively to dissolve it.

4 Claims, 3 Drawing Figures

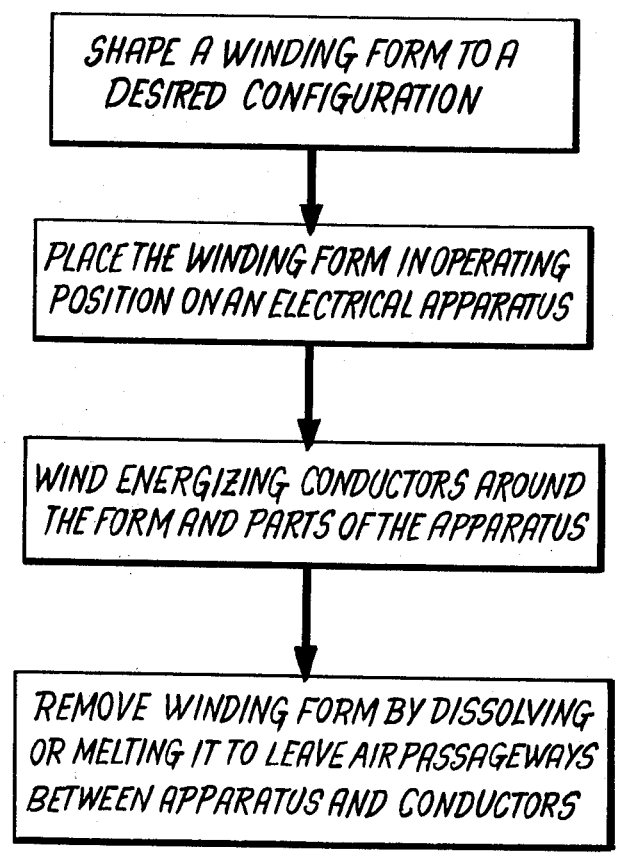

WINDING FORM FOR DYNAMOELECTRIC MACHINE

BACKGROUND OF THE INVENTION

The invention relates to dynamoelectric machine windings and methods for applying such windings to core structures of a dynamoelectric machine and, more particularly, relates to a unique winding form and a method for using such a winding form to apply an electrical winding to the core of a dynamoelectric machine in a manner such that cooling air passageways are readily and efficiently defined between respective turns of the winding and adjacent preselected portions of the core.

In order to improve the heat dissipating characteristics of various types of electrical apparatus that are energized with an electrical winding, it is desirable to form cooling air passageways between turns of the energizing winding and between portions of the winding and adjacent surfaces of the core structure of the apparatus. For example, in the manufacture of dynamoelectric machine rotors that are energized with random-wound windings having axially extended portions thereof mounted in winding slots formed in the periphery of the rotor, it is desirable to form air passageways between the end turns of the windings, and to space the end turns from the respective ends of the rotor so that during its rotation, cooling air will circulate through those passageways and rapidly dissipate heat from the windings.

Before the present invention, in order to provide such cooling air passageways between the end turns of the random wound motor and adjacent magnetic core laminations, it was necessary to either carefully manually arrange the winding turns as they were applied to the rotor to define such desired spacing, or to place manually removable inserts between the winding turns and the core of the machine in order to space the windings from the core during the winding operation. Such known manufacturing techniques are relatively slow and expensive to utilize, and often result in undesirable variations in the pattern of windings applied to the machine. To overcome the drawbacks of known prior art manufacturing techniques, it would be desirable to provide a winding form that could be used in a unique winding method to quickly and efficiently mount a winding in a desired predetermined configuration on an electrical apparatus so that cooling air passageways are defined between the turns of the winding and between the winding turns and the core of the apparatus.

Accordingly, it is a primary object of the invention to provide an improved winding form for use in winding an energizing coil on an electrical apparatus.

Another object of the invention is to provide a winding form for use in the manufacture of a dynamoelectric machine rotor to provide consistent spacing between respective turns of the energizing winding of the rotor and between the winding end turns and the outermost laminations of the rotor.

A further object of the invention is to provide a winding form for mounting an energizing winding on an electrical apparatus and for enabling the winding form to be quickly and easily removed from between the apparatus and the installed winding by being either dissolved or melted sufficiently to essentially completely remove the form.

Still another object of the invention is to provide a method for mounting an energizing winding on an electrical apparatus by using a readily removable form to space the end turns of the winding in predetermined spaced relationship to one another and to preselected portions of the apparatus, then to remove the winding form from its operative position by either dissolving or melting it away.

Yet another object of the invention is to provide a method for making a dynamoelectric machine rotor by mounting foamed-polystyrene winding forms on axially opposite ends of the rotor, applying a winding around the rotor in respective radially aligned, axially extended winding slots therein, and placing the winding end turns over the polystyrene winding forms to space the end turns in predetermined configuration relative to one another and the machine core, then dissolving or melting the winding forms to remove them from the apparatus and leave cooling air passageways in the areas formerly occupied by the winding forms.

A still further object of the invention is to provide a winding form and method for using same to apply an electrical energizing winding to an electrical apparatus more efficiently and uniformly than was possible with prior art winding inserts and manual winding methods.

SUMMARY OF THE INVENTION

In a preferred embodiment of the invention, a winding form comprising a removable body of material is shaped to define surfaces of predetermined configuration for spacing the end turns of an energizing electrical winding from one another and from preselected surface areas of the apparatus when the form is used to assemble an energizing winding on the apparatus. After the winding is wound on the apparatus around the winding forms, the forms are removed from between the winding turns and the apparatus by being either dissolved or melted away.

In the method of the invention, winding forms of foamed material are mounted adjacent to preselected surface areas of an electrical apparatus, then energizing winding turns are placed around the apparatus and over the outer suraces of the winding forms which act to space the winding turns from one another and from the adjacent ends of the apparatus. After the winding operation is completed, the winding forms are removed from between the winding end turns and the core of the apparatus by being either dissolved in a solvent or thermally melted to leave cooling air passageways in the areas formerly occupied by the winding forms.

BRIEF DESCRIPTION OF THE DRAWINGS

FIG. 3 is a flow charge of a preferred sequence of method steps for practicing the method of the invention.

DESCRIPTION OF THE PREFERRED EMBODIMENTS

As the description of the invention herein will disclose, a variety of different types of electrical apparatus can be manufactured with the invention. For example, energizing windings can be mounted on magnetic cores of transformers, or energizing windings can be mounted on the core elements of dynamoelectric machines. To simplify the description of the invention, the method of the invention will be explained with reference to its application in the manufacture of a random wound rotor for a dynamoelectric machine such as an electric motor. Similarly, the preferred embodiment of the winding form of the invention is disclosed herein in a form suitable for use in winding a random wound rotor for a dynamoelectric machine.

Figure 1:
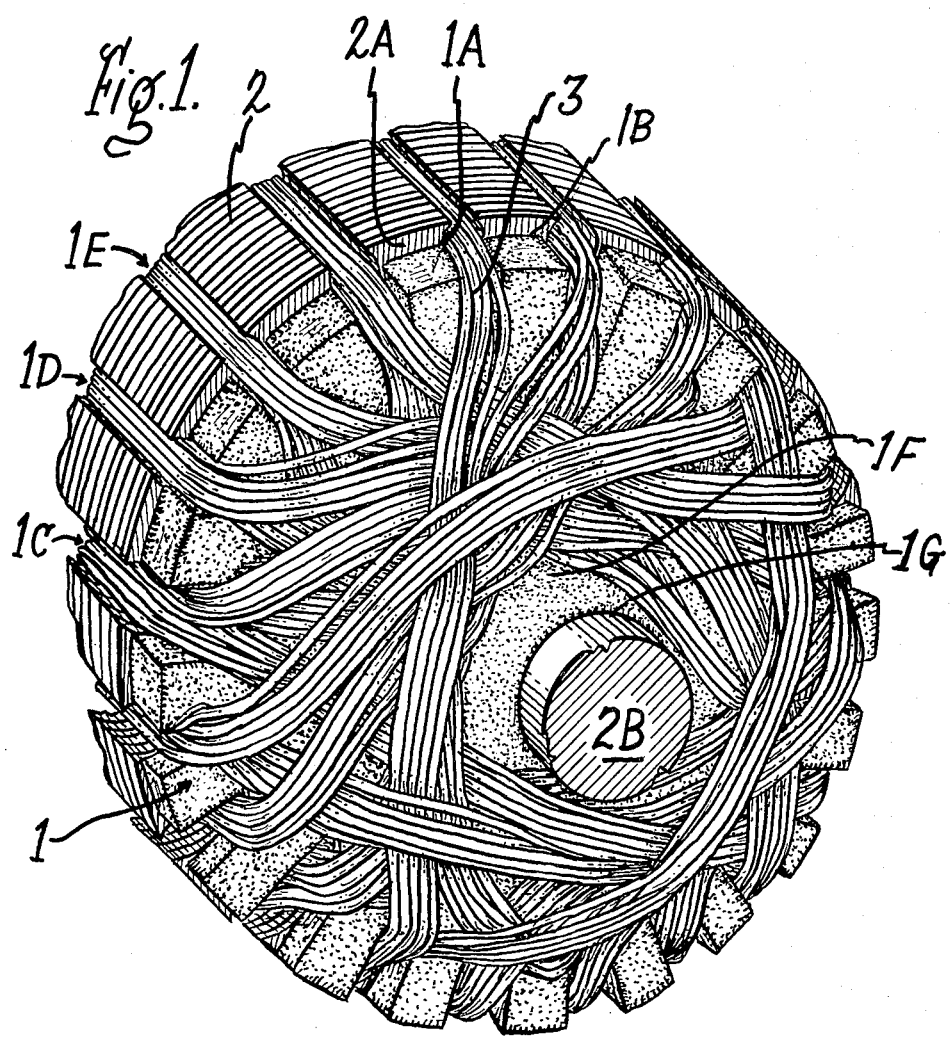
FIG. 1 is a perspective view showing one end of a dynamoelectric machine rotor having a random wound coil mounted thereon and including a winding form constructed according to the invention and mounted in operative position between the winding end turns and an outermost end lamination of the rotor.

Referring now to FIG. 1 of the drawing, there is shown a winding form 1 mounted in operative position on one end of a dynamoelectric machine rotor 2 and partially surrounded by end turns 3 of a random-wound winding for energizing the rotor. The purpose of the winding form 1 is to provide a means for positioning the turns of the electrical winding in a predetermined configuration on the electrical apparatus comprising the rotor 2 and a drive shaft 2B concentrically mounted therein.

In the disclosed embodiment of the invention, the winding form 1 comprises a body of relatively rigid material that has a first surface 1A that is formed to generally define a portion of the outline of a desired predetermined configuration for the end turns of the random-wound windings 3. Specifically, the desired predetermined configuration for the end turns of the winding is one that will result in the formatin of coolant passageways between the respective end turns and the axially outer surface 2A of the rotor 2. The purpose of such a desirable configuration of the winding end turns is to assure that cooling air will flow readily around these components during operation of the rotor.

The winding form is further shaped to have a second surface 1B (that conforms generally to a preselected surface portion of the electrical apparatus or rotor 2). Of course, in the illustrated embodiment, the preselected portion to which the surace 1B of winding form 1 conforms is the generally flat and circular surface of the axially outer end surface 2A of the rotor 2, including the winding slots at the periphery of the rotor. Rather than being provided with outwardly flared tips, such as those on the tips of the teeth of the winding slots, the teeth on the winding form are made generally rectangular in form.

In order to accomplish the above-mentioned objects of the invention, a number of suitable commercially available materials can be used to make the winding form 1. In the preferred embodiments of the invention, the winding form 1 is made of a suitable foamed material such as thermoplastic foamed polystyrene. In selecting materials for the winding form 1, it is important that only those materials be selected that will enable the body of the winding form 1 to be effective when positioned on the rotor 2 to support the end turns of the insulated electrical winding 3 on the rotor in suitable spaced relationship to one another and to the preselected outer end surface portion of the rotor 2 that is abutted by the form. To accomplish this objective in the disclosed embodiment, a body of foam material 1 is formed with a plurality of slots 1C, 1D, 1E, etc. at spaced points on the periphery of the first surface 1A of the winding form 1, for receiving therein the respective turns of the electrical winding 3 in order to hold the turns in spaced relationship to one another. As noted above, the slots 1C–1E, etc. can take varius forms, but in this embodiment they are generally straight-sided rather than being made to conform exactly to the shape of the rotor teeth.

In addition, the winding form in this embodiment of the invention is provided with a generally cylindrical surface portion 1F that has an outer diameter substantially greater than the diameter of the drive shaft 2B of the rotor about which the winding 3 is wound. This shape of the cylindrical surface 1F causes the portions of the winding abutting the outer surface portions of the winding form to be spaced a desirable distance from the drive shaft 2B as the winding is placed on the rotor 1. Finally, the winding form 1 is further shaped to define a bore through the body of foamed material concentric with the generally cylindrical outer surface portion 1F thereof. The bore 1G is made to slidably receive therein the drive shaft 2B so that the drive shaft will serve to support the winding form 1 in operative position adjacent to the axially outer surface of the rotor 2, prior to the time that the winding 3 is mounted in the slots of the rotor. According to the invention, it is important that the body of material used to make the winding form 1 be capable of being readily dissolved to enable it to be essentially completely removed from between the winding turns and the rotor 2 without impairing the insulation on the winding turns.

It should be understood that the material selected to make the winding form 1 of the invention can be selected so that it will be sufficiently removed from between the winding turns and the associated electrical apparatus by either exposure to a suitable dissolving solvent for a predetermined period of time, or by exposure of the material to a predetermined temperature for a selected interval of time sufficient to cause thermoplastic contraction or essentially complete melting of the material. A prefered material for this purpose in the disclosed embodiment of the invention is a commercially available foamed polystyrene as mentioned above.

In practicing the invention with a body of commercially available foamed polystyrene, for example, such as that sold under the trade name Styrofoam, the winding turn positioning slots 1C–1E, etc. are formed therein by simply cutting them in the outer peripheral surface of a block of the material. Likewise, the outer cylindrical surface 1F and the bore 1G in the body can be formed by simply cutting or otherwise conventionally machining those surfaces.

Figure 2:
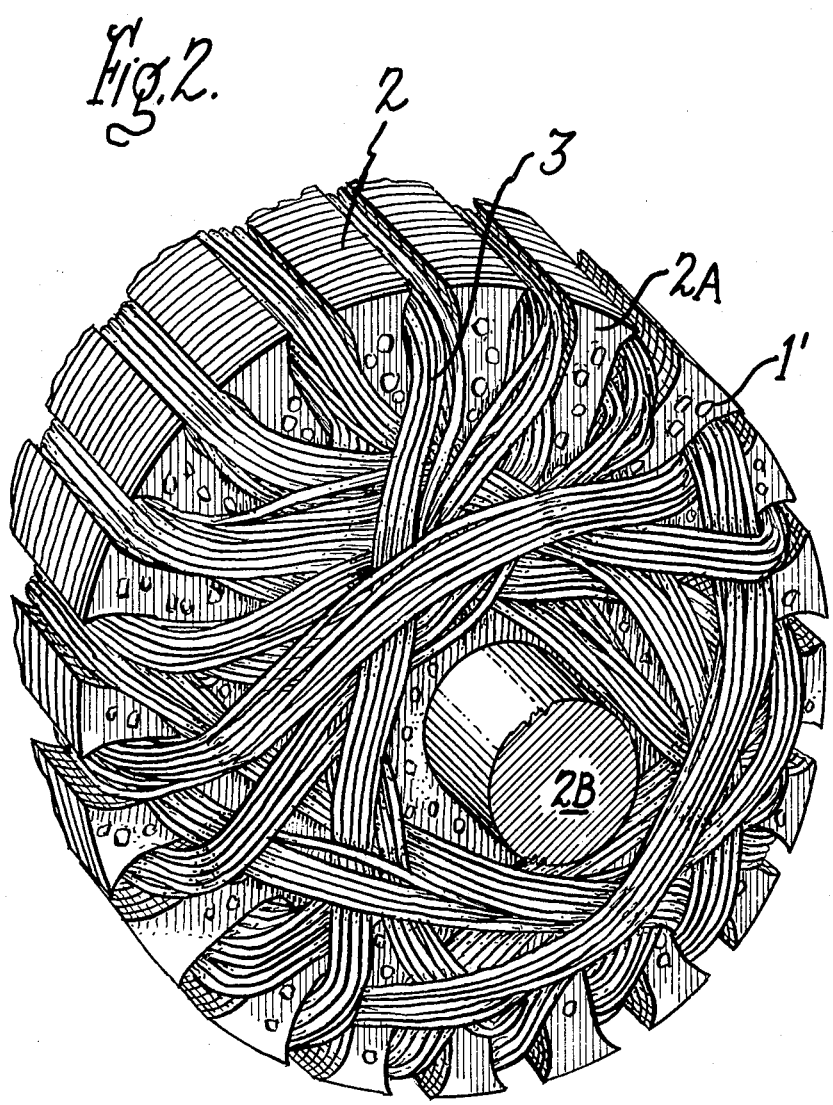
FIG. 2 is a perspective view of the rotor shown in FIG. 1, illustrating the appearance thereof after the removable winding form has been essentially completely dissolved or melted to remove it from between the winding end turns and the rotor core according to the method of the invention.

Referring to FIG. 2, there is shown the same end of the rotor 2 illustrated in FIG. 1, after the winding form 1 has been essentially completely removed from between the turns 3 and axially outer surface 2A of the rotor nearest to the winding form 1. In this illustrated form of the rotor, there are shown a few melted particles 1' of the winding form 1 (of FIG. 1). Such particles are all that is left of the winding form 1 after it has been subjected to a predetermined temperature for a selected length of time sufficient to thermo-plastically deform or melt the winding form 1 and thereby essentially remove it from between the end turns 3 and the rotor 2. It has been found that by exposing such a winding form made of a foamed polystyrene to a temperature in the range of 180° C. to 200° C. the form can be melted at a sufficiently rapid rate for most motor manufacturing purposes. The resultant winding 3 contains a plurality of coolant passageways (as seen in FIG. 2) between the respective winding end turns and the axially outer surface 2A of the rotor 2, as well as being formed to define an air passageway in the area around the drive shaft 2B, formerly occupied by the generally cylindrical surface portion 1F–1G of the winding form 1. In alternative embodiments the form 1 can be made of a material such as napthalene, that sublimes directly from a solid to a gaseous state, thereby to avoid the deposit of any melt particles on the rotor.

The winding form 1 could also be removed according to the invention by exposing it to a suitable solvent, such as acetone, toluene or Xylene, for example, for a sufficient period of time to essentially completely dissolve the winding form from between the winding end turns 3 and the rotor 2. Such a dissolving operation should be limited in duration sufficiently to avoid impairing the insulating characteristics of the insulation on the winding end turns 3.

From the foregoing description of the apparatus of the invention, it is believed that those skilled in the art will be able to practice the invention in the manufacture of various types of electrical apparatus; however, the desirable features of the invention and its implementation will be more fully understood from the description of a preferred method of the invention that will now be given with particular reference to FIG. 3 of the drawing. As mentioned at the outset, the method of the invention can be used for positioning an electrical winding in a predetermined configuration on various different types of electrical apparatus in order to define air passageways between the apparatus and portions of the winding. A first preferred step in practicing such a method is to form a body of generally rigid foamed material to define a first surface that conforms generally to the outline of the predetermined configuration desired for the electrical energizing winding and to further form the body of material to define a second surface that conforms generally to a preselected surface portion of the electrical apparatus. The next step in practicing the preferred method is to position the body of foamed material with its second surface against the preselected surface portion of the electrical apparatus. For example, referring again to FIG. 1 of the drawing, the second step of the invention would result in placing the second surface 1B of the winding form 1 against the axially outer surface 2A of the rotor 2, if a rotor such as that shown in FIGS. 1 and 2 were being manufactured with the method of the invention. After the winding form is thus placed in operating position on the electrical apparatus, an electrical conductor is tightly wound around part of the apparatus and around the body of the winding form in order to arrange the conductors in the desired predetermined configuration.

Finally, the winding form is removed from between the winding and the electrical apparatus to leave air passageways between the energizing windings and the apparatus in the areas formerly occupied by the body of material that made up the winding form.

As explained above with reference to the embodiment of the winding form disclosed as the preferred apparatus of the invention with reference to FIGS. 1 and 2, the winding form can be removed from between the energizing conductors or electrical winding and the apparatus on which it is wound by either exposing the body of foamed material to a suitable dissolving solvent for a predetermined period of time sufficient to essentially completely dissolve the body of material, or by exposing the body of material to heat at a predetermined temperature sufficient to cause thermo-plastic contraction or substantially complete sublimation or melting of the body of the winding form material thereby to essentialy completely remove it from between the wound conductors and the electrical apparatus.

In practicing the preferred method of the invention, the body of material used to make the winding form 1 is foamed polystyrene in which a plurality of slots are cut in the outer periphery as shown in FIG. 1, and first and second surfaces are defined in the winding form by suitable conventional cutting or machining operations such as those described above.

It will be recognized that in practicing the invention on certain electrical apparatus, such as in the manufacture of an electric motor rotor equivalent to that illustrated in FIGS. 1 and 2, a second body of foamed material can be used to shape a second winding form that would be placed on the axially opposite end of the rotor 2 before the winding 3 is mounted thereon. The second winding form would have essentially the same configuration as the first winding form 1, and would be effective to space the respective end turns of the winding 3 on the opposite end of the rotor 2 from one another and from that opposite end of the rotor in the manner described above relative to the end 2A of the rotor 2 illustrated in FIGS. 1 and 2. With such an additional winding form, both of the ends of the winding 3 would be spaced in a desired configuration to define air coolant passageways between the winding end turns and the adjacent axially outer ends of the rotor 2 and the respective ends of the drive shaft 2B.

Further modifications and alternative forms of the invention will be apparent from the disclosure of it presented herein; accordingly, it is our intention to encompass within the scope of the following claims the true limits of the invention.

What we claim and desire to secure by Letters Patent of the United States is:

1. A winding form for positioning an electrical winding in a predetermined configuration on an electrical apparatus to define air passageways between an axially outer surface portion of the apparatus and end turn portions of the winding, comprising a body of relatively rigid material having a first surface that generally defines a portion of the outline of said predetermined configuration and having a second surface that conforms generally to a preselected axially outer surface portion of said apparatus, said body of material being effective when positioned on said axially outer surface portion of the apparatus to support turns of an insulated electrical winding on the apparatus in spaced relation to one another and to said preselected axially outer surface portion of the apparatus, said body of material being capable of being readily dissolved to enable it to be essentially completely removed from between the winding turns and the axially outer surface portions of the apparatus without impairing the insulation on the winding turns, said body of material comprising a body of foamed polystyrene.

2. A winding form as defined in claim 1 wherein said body of foamed material is formed with slots at spaced points on the periphery of said first surface for receiving therein respective turns of said electrical winding thereby to hold said turns in spaced relation to one another.

3. A winding form as defined in claim 2 wherein said electrical apparatus is a dynamoelectric machine having a drive shaft and wherein said first surface of the body of foamed material is formed with a generally cylindrical surface portion that has an outer diameter substantially greater than the diameter of said drive shaft about which the winding is wound, thereby to space those portions of the winding abutting said cylindrical portion from the drive shaft.

4. A winding form as defined in claim 3 wherein said body of foamed material is shaped to define a bore through the body of foamed material concentric with said generally cylindrical surface portion for slidably receiving therein said drive shaft.

* * * * *